United States Patent [19]
Garza

[11] Patent Number: 5,240,668
[45] Date of Patent: Aug. 31, 1993

[54] METHOD FOR FORMING A MOLD

[75] Inventor: Luis A. A. M. Garza, Mexico D.F., Mexico

[73] Assignee: Vidrio Plano De Mexico, S.A., Mexico

[21] Appl. No.: 566,034

[22] Filed: Aug. 13, 1990

Related U.S. Application Data

[63] Continuation-in-part of Ser. No. 519,395, May 4, 1990.

[51] Int. Cl.$^5$ ............................................. B29C 33/40
[52] U.S. Cl. ................................. 264/225; 264/252; 164/15
[58] Field of Search ............... 264/219, 220, 221, 225, 264/226, 227, 252; 164/15

[56] References Cited

U.S. PATENT DOCUMENTS

| | | | |
|---|---|---|---|
| 3,860,470 | 1/1975 | Jaisle | 264/220 |
| 4,030,188 | 6/1977 | Reiland | 264/227 |
| 4,048,709 | 9/1977 | Deem | 264/227 |
| 4,072,673 | 2/1978 | Lammers | 264/227 |
| 4,231,982 | 11/1980 | Jansson | 264/227 |
| 4,561,625 | 12/1985 | Weaver | 249/85 |
| 4,662,113 | 5/1987 | Weaver | 49/404 |
| 4,688,752 | 8/1987 | Barteck et al. | 249/85 |
| 4,762,481 | 8/1988 | Weaver | 425/116 |
| 4,795,667 | 1/1989 | Armstrong | 428/77 |
| 4,824,628 | 4/1988 | Curfman | 264/225 |
| 4,830,804 | 5/1989 | Weaver | 264/139 |
| 4,834,929 | 5/1989 | Dehoff et al. | 264/266 |
| 4,860,815 | 8/1989 | Parker | 264/227 |

FOREIGN PATENT DOCUMENTS

| | | |
|---|---|---|
| 2157189 | 6/1973 | France . |
| 57-158481 | 9/1982 | Japan . |
| WO85/01468 | 4/1985 | PCT Int'l Appl. . |

OTHER PUBLICATIONS

W. E. Becker (editor), Reaction Injection Molding, 78–86 & 215–235 (1979).
Bayer Polyurethanes, Bayer Chemical Co. (circa 1979), pp. 130–139.

*Primary Examiner*—Bernard Nozick

[57] ABSTRACT

A method for forming a mold for encapsulating glass sheets with a gasket which includes the steps of positioning a rigid member 18 having a finishing surface 19 and a seal 30 adjacent a model 2, forming a first mold section 10 about the rigid member 18, the seal 30, and the model 2 and adjacent the first side of the model 2, forming a second mold section 12 adjacent a second side of the model 2, and then separating the first mold section 10 and the second mold section 12 and removing the model 2. In one embodiment of the invention, the rigid member 18 is prepared by forming an initial member 24 corresponding at least in part to the shape of the model 2, using the initial member 24 to prepare a cast, casting the rigid member 18 in the cast, and then preparing a finishing surface 19 of the rigid member 18.

20 Claims, 4 Drawing Sheets

METHOD FOR FORMING A MOLD

CROSS-REFERENCE TO RELATED APPLICATIONS

This is a continuation-in-part of my copending application Ser. No. 519,395, filed May 4, 1990.

BACKGROUND OF THE INVENTION

The present invention relates to an improved method for forming a mold. More particularly, the invention relates to a method for producing a mold which can be used to form an encapsulated window assembly including a glass sheet and a gasket of a polymeric material which is formed to encapsulate the peripheral edge of the sheet.

Early window assemblies for automobiles often included a number of different elements, including adhesive sealants, mechanical fasteners, and exterior trim pieces. Subsequent window assemblies were developed in attempts to further improve on the earlier window assemblies. An illustration of a more recent window assembly is provided in U.S. Pat. No. 4,072,340, which is incorporated herein by reference. The window assembly disclosed in this latter patent includes a glass sheet, a frame, fasteners for affixing the assembly to a vehicle, and a casing or gasket of a molded material extending between the frame and the edge of the glass sheet. The purpose of such a gasket is to hold the glass sheet and the frame together.

In connection with the manufacture of window gasket assemblies of the more recent design, a mold apparatus is used. The mold typically used includes two mold sections which define a chamber for receiving the sheet. Such molds also include a gasket forming cavity formed by the cooperation of the mold sections, the sheet (around the peripheral edge of which a gasket is to be formed), and one or more seals positioned within the mold sections. An illustration of such a mold apparatus is provided in U.S. Pat. No. 4,561,625, which is incorporated herein by reference. Another illustration of such a mold apparatus is provided in U.S. Pat. No. 4,688,752, which is incorporated herein by reference.

A smooth and polished finish on any exposed surface of the window gasket assembly to be formed, usually the exterior facing surface of the window gasket assembly to be installed in an automobile window opening, is desired for aesthetic reasons. The facing surface of the metallic mold section which defines an exposed or exterior surface of the window gasket assembly is thus usually finished or polished so as to provide a smooth and finished surface corresponding to the exterior facing surface of the window gasket assembly. Since the mold sections typically are made of metal, it is undesirable for the glass sheet to contact the mold sections, as such contact leads to excessive breakage and scratching. Thus, a chamber in which the glass sheet is to be positioned is often formed in the interior of such molds so that the sheet, around the periphery of which an encapsulating gasket is to be formed, is not in contact with the mold sections.

As noted, conventional mold sections are made of metal. Hence, forming such mold sections typically requires a substantial amount of machining and hand labor so that the mold sections fit tightly together, precisely define the dimensions of the cavity in which a gasket is to be formed, and do not touch the glass sheet on the peripheral edge of which a gasket is to be molded. Such machining and labor generally takes a substantial amount of time and thus is fairly expensive. Because a different mold (and therefore a different pair of mold sections) is needed to form a window gasket assembly of a different shape (such as is needed for different windows or for different types of vehicles), the amount of time and money needed to prepare a number of different mold sections can be quite substantial. Finally, the costs of the metal used in making the mold sections means that such mold sections are more expensive and any scrap resulting from making such mold sections is costly.

SUMMARY OF THE INVENTION

The present invention concerns an improved method for forming a mold apparatus for producing a window gasket assembly comprising a gasket and a sheet. The present invention may be incorporated into a method for forming a mold which comprises two mold sections. According to the invention, a rigid member having a finishing surface corresponding to at least a portion of a first side of an object and a seal are positioned adjacent to the first side of the object, a first mold section is formed about the rigid member, the seal, and the first side of the object, and a second mold section is formed about the second side of the object, then the mold sections are separated and the object is removed from the mold sections. According to another aspect of the invention, the step of preparing a model of an object to be formed may be included.

Accordingly, it is an object of the present invention to provide a method for more efficiently forming a mold.

It is a further object of the present invention to provide a less expensive method for forming a mold.

It is a further object of the present invention to provide a quicker method for forming a mold.

It is a further object of the present invention to provide a quicker and less expensive method for forming a mold for producing a window gasket assembly.

It is a still further object of the present invention to provide a method for making a mold which assures a perfect (or nearly perfect) match between the cooperating mold sections The above and other advantages of the present invention will become readily apparent to those skilled in the art from the following detailed description of the invention, and from the attached drawings, which are briefly described below.

DETAILED DESCRIPTION OF THE INVENTION

Figure 1:
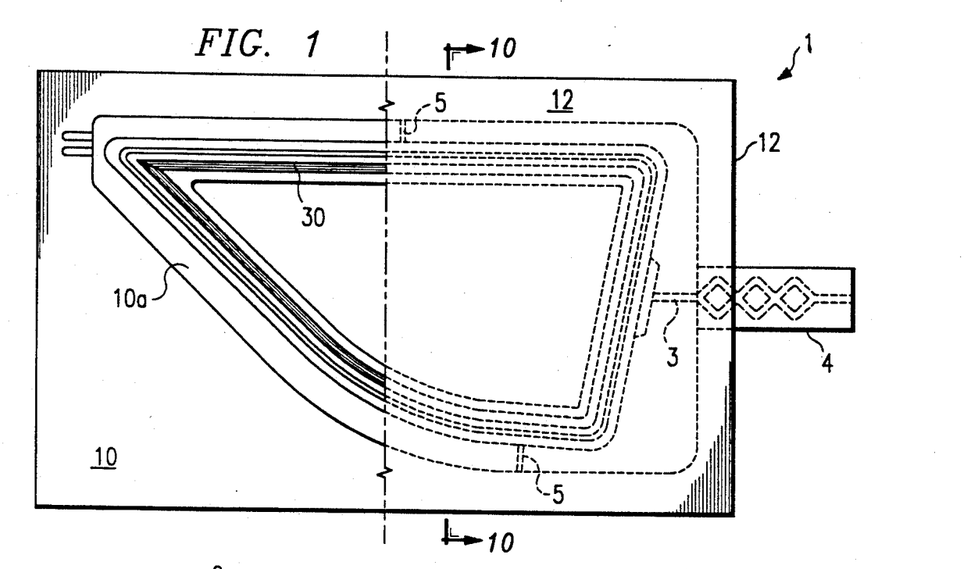
FIG. 1 is a top view of the first and second mold sections formed according to the present invention, together forming a mold, with the right-hand portion providing a top view of the second mold section and the left-hand portion providing a top view of the first mold section.

Referring to FIG. 1, there is shown a mold 1 formed according to the present invention. The mold 1 is specifically adapted to form a gasket encapsulating at least a portion of the periphery of a sheet, thereby forming a window gasket assembly adapted for easy installation in a vehicle body. The term "sheet" as used herein will be understood to mean any sheet of material, such as a sheet of glass, plexiglass, or some other plastic or other material. In the preferred embodiment, the invention is used to prepare a mold 1 for forming a window gasket assembly to be used to fill an aperture or opening in a vehicle body, such as in automobiles, trucks, and other vehicles. It will be appreciated, however, that the claimed invention also may be used to form molds for forming window gasket assembles for other applications, including not only automotive but also architectural, appliance, boating, and other applications, and for forming objects other than window gasket assemblies.

Still referring to FIG. 1, the mold 1 is comprised of a first mold section 10 and a second mold section 12. In FIG. 1 the first mold section 10 is the lower mold section, with the left-hand portion of FIG. 1 showing a top view of the first mold section 10. The second mold section 12 is the upper mold section of the mold 1, with the right-hand portion of FIG. 1 showing a top view of the second mold section 12. The first and second mold sections 10 and 12 are formed to have facing surfaces (as described in detail below) which together define a gasket forming cavity when the mold 1 is closed (and the first and second mold sections 10 and 12 are in contact with one another). The mold 1 is inserted into or attached to or placed on a conventional mold press or other similar apparatus (not shown) of a type which is well known in the art, and which will open and close the first and second mold sections 10 and 12 in a conventional manner.

As shown in FIG. 1, the mold 1 includes an inlet channel 3 for allowing the injection of a gasket forming material into the gasket forming cavity formed by the mold 1 (described below). The inlet channel 3 is preferably in fluid communication with an aftermixer 4. The gasket forming material is injected into the aftermixer 4, such as by conventional injection molding means (not shown), is more thoroughly mixed by the aftermixer 4, and then travels through the inlet channel 3 and enters and fills the gasket forming cavity. Still referring to FIG. 1, outlet channels 5 are provided in the mold 1. The outlet channels 5 allow fluid communication between the gasket forming cavity (as described below) and the exterior of the mold 1. Typically, the outlet channels 5 comprise hollow cavities extending between the gasket forming cavity and the exterior of the mold 1. Such outlet channels 5 allow air (or any other fluid) within the gasket forming cavity to escape when the gasket forming cavity is filled with a gasket forming material. For a detailed description of such a mold 1 and the molding process using the mold 1 to form a window gasket assembly, see my copending U.S. patent application Ser. No. 519,395, filed May 4, 1990, which is incorporated by reference herein.

Figure 10:
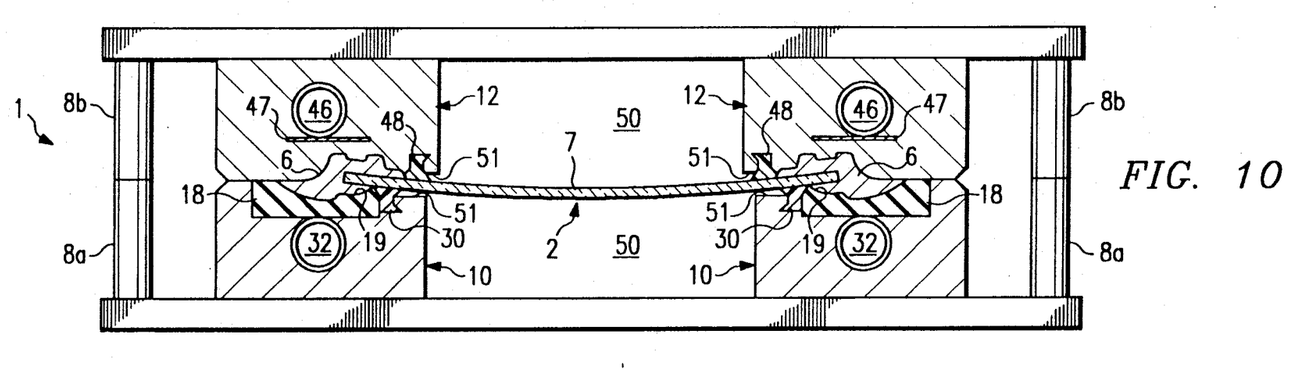
FIG. 10 is a sectional view taken along line 10—10 of FIG. 1, showing the model and the first and second mold sections with portions thereof removed to define a cavity.
Figure 11:
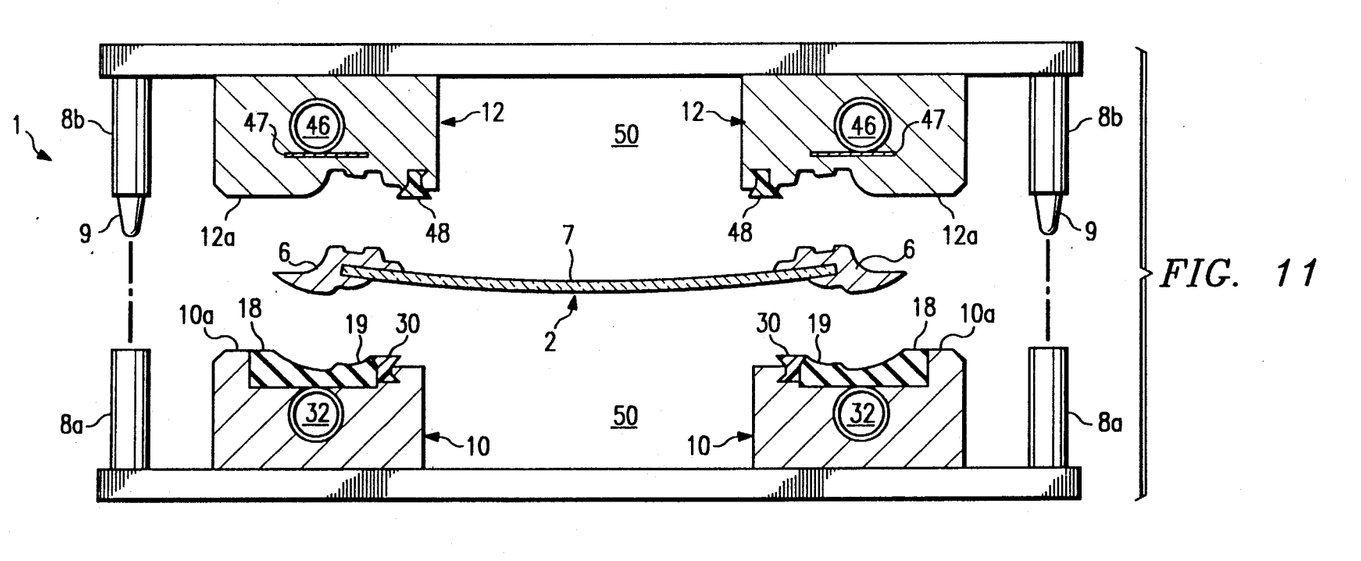
FIG. 11 is a sectional view of the first and second mold sections in a separated position with the model having been separated and removed therefrom.

Referring now to FIGS. 10 and 11, in a mold 1 formed in accordance with the present invention, the first mold section 10 has positioned therein a rigid member 18, which is preferably made of steel and has a finishing surface 19. The rigid member 18 need not be made of steel, however, as other rigid materials such as metals like aluminum may be used. For best results, the rigid member 18 has a polished steel finishing surface 19 for providing a smooth and aesthetically acceptable finish on a gasket to be formed within the gasket forming cavity of the mold 1. Thus, when the mold 1 is closed and the first and second mold sections 10 and 12 are brought together, the finishing surface 19 of the rigid member 18 cooperates with one or more seals (discussed below) and the sheet to define the gasket forming cavity within the mold 1. The finishing surface 19 of the rigid member 18 typically defines a portion of the gasket forming cavity so that there is an exterior or exposed surface portion of the gasket to be formed within the gasket forming cavity which corresponds to the finishing surface 19. A polished finishing surface 19 will result in the formation of a glossy or bright exposed surface portion of the gasket to be formed which corresponds to the finishing surface 19. A less polished finishing surface 19, however, can be used to obtain a duller or flat finish for the corresponding exposed surface portion of the gasket As will be appreciated, the rigid member 18 and the finishing surface 19, as shown in FIGS. 10 and 11, can be prepared in a number of ways. Given a set of specifications for a window gasket assembly to be formed, the rigid- member 18 can be formed by standard techniques, such as by machining, sand casting or forging. Other ways to form the rigid member 18 will be understood to those skilled in the art. A preferred method for preparing the rigid member 18 is described below.

Figure 2:
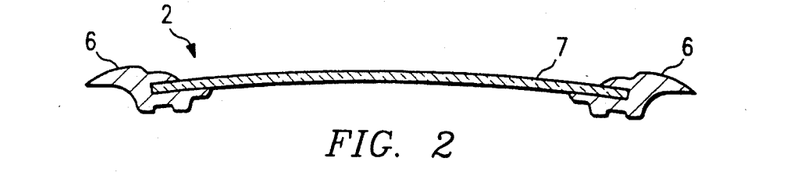
FIG. 2 is a sectional view of a model of a window gasket assembly.

FIG. 2 shows a model 2 of a window gasket assembly, comprising a gasket portion 6 and a sheet portion 7. In the figures and discussion below, the method of the present invention is discussed in connection with forming a mold 1 to be used in connection with forming window gasket assemblies. In the preferred embodiment of the invention, a model 2 of the window gasket assembly is used. It will be understood, however, that objects other than window gasket assemblies can be used in connection with the method of the present invention It will also be understood that the model 2 used in connection with forming the mold 1 as described below need not be a model of a window gasket assembly. Instead, a finished window gasket assembly (or some other object of the kind to be formed by the mold 1) could be used to prepare a mold 1 according to the present invention. Hence, it will be understood that objects other than the model 2 can be used in accordance with the present invention.

As shown in FIG. 2, the gasket portion 6 and the sheet portion 7 of the model 2 of the window gasket assembly are distinct elements; the window gasket assembly model 2 shown in FIG. 2 is thus comprised of two pieces. It will be understood, however, that the model 2 can be prepared from a single piece or can be prepared from and include more than two distinct pieces. In the preferred embodiment of the invention, the model 2 of the window gasket assembly is made of wood. Other materials, such as polymeric resins and glass, also can be used, especially to prepare or form the sheet portion 7 of the model 2. Given the desired specifications and dimensions for a window gasket assembly to be manufactured by a mold 1 to be formed in accordance with the present invention, a model 2 of the desired window gasket assembly can be prepared by using standard machining techniques and/or by hand labor techniques to form model 2 from wood; such techniques are well known to those skilled in the art.

Figure 3:
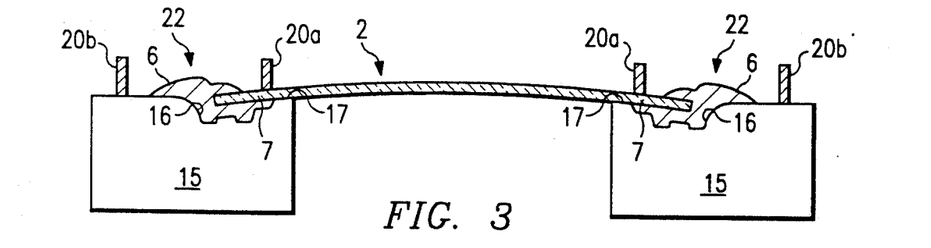
FIG. 3 is a sectional view of the model resting on a support with a pair of retaining walls defining a channel therebetween resting on the model and the support.
Figure 6:
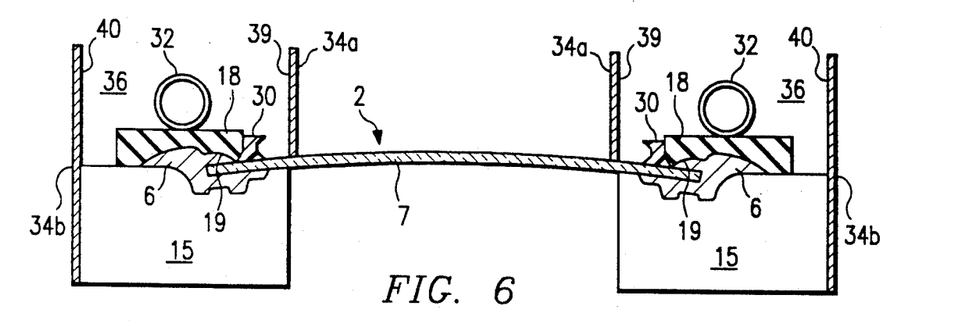
FIG. 6 is a sectional view of the model resting on a support with the rigid member, the seals, the temperature control passageways, and a pair of retaining walls defining a channel therebetween all positioned with respect to the model.

The next several paragraphs describe a preferred method for preparing the rigid member 18, which is shown in FIG. 6. Referring now to FIG. 3, the model 2 is shown resting on a support 15. As is shown in FIG. 3, the support 15 has an upper surface which includes surface portions 16 and 17 which correspond to and conform to the shape of the gasket portion 6 and sheet portion 7 of the model 2, respectively. The support 15 can be made of a number of materials such as wood, metal, or a polymeric resin, or a combination thereof. In the preferred embodiment of the invention, the support 15 is made primarily of wood with a polymeric resin included to provide a finish for the surface portion 16 corresponding to the shape of the gasket portion 6 of the model 2. Such a finish provides a better fit between the model 2 and the support 15. Such a resin finish for the surface portion 16 of the support 15 can be provided by pouring a liquid polymeric resin into the surface portion 16 of the support 15, positioning the model 2 adjacent the support 15 (so that the gasket portion 6 of the model 2 fits within the recessed surface portion 16 of the support 15), and then allowing the resin to harden, thus forming the finish. Prior to such positioning of the model 2, the release agent QZ 11,which is commercially available from CIBA GEIGY, can be applied to the model 2, thereby easing the later separation of the model 2 from the resin finish so formed on the surface portion 16. Various types of polymeric resins may be used to form the resin finish. For best results, I prefer to use automotive plastic filler, which is commercially available from Commex in Mexicy City, Mexico.

Once the model 2 has been positioned on the support 15 and is securely resting on the support 15 with its first side exposed, a first pair of corresponding retaining walls 20a and 20b are positioned on top of the model 2 and the support 15, respectively. As shown in FIG. 3, one of the retaining walls 20b is located on top of the support 15 and is located on the outside of the peripheral edge of the model 2, while the other retaining wall 20a is located on the model 2. As shown in FIG. 3, a first channel 22 extending around the peripheral edge of the model 2 is thus formed between the retaining walls 20a and 20b, with the bottom of the first channel 22 defined by and adjacent the support 15, the top surface of the gasket portion 6 of the model 2 and the top surface of the peripheral portion of the first side of the sheet portion 7 of the model 2.

In the preferred embodiment of the invention, a liquid resin is then cast or poured into the channel 22 defined by the retaining walls 20a and 20b. For best results, I prefer to use the polymeric liquid resin UREOL, which is commercially available from CIBA GEIGY. It will be understood, however, that other resins, plastics, and other materials, including but not limited to metals, may be used to fill the channel 22. For best results, I also prefer to coat the inner sides of the retaining walls 20a and 20b which define the channel 22 therebetween, as well as the bottom of channel 22 (i.e., a portion of the support 15, the gasket portion 6 and a part of the sheet portion 7 of model 2), with a release agent prior to pouring the liquid resin into the channel 22. For best results, I prefer to use the release agent QZ 11, which is commercially available from CIBA GEIGY, although other types of release agents may be used. When the liquid resin cures or hardens, it forms an initial member 24 which corresponds to the channel 22.

Figure 4:
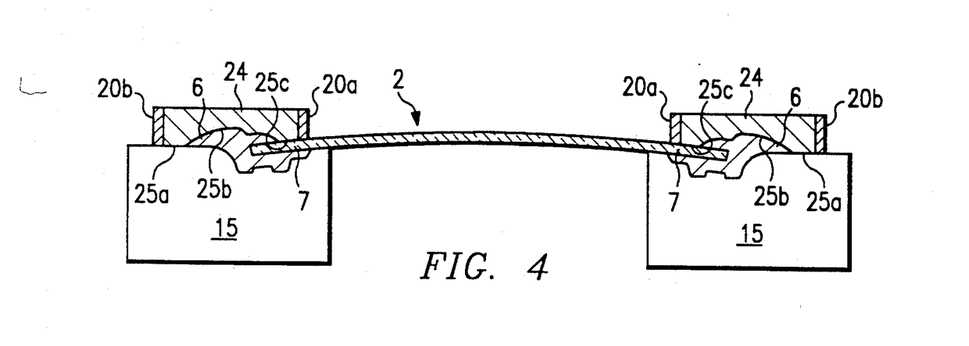
FIG. 4 is a sectional view of the model resting on a support as in FIG. 3 with an initial member having been cast in the channel between the retaining walls.

FIG. 4 shows the model 2 resting on the support 15, together with the retaining walls 20a and 20b and the initial member 24 which has been cast in the channel 22 defined by the retaining walls 20a and 20b. As shown in FIG. 4, the initial member 24 has been formed ajacent to the top surface of a peripheral portion of the model 2. The initial member 24 so formed has surfaces 25a, 25b, and 25c facing and abutting the support 15, the gasket portion 6, and the sheet portion 7, respectively. Once the liquid resin or other material used to form the initial member 24 has been allowed to at least partially cure or harden, the retaining walls 20a and 20b can be removed and the initial member 24 thus formed within the channel 22 can be separated and removed from the model 2.

Figure 5:
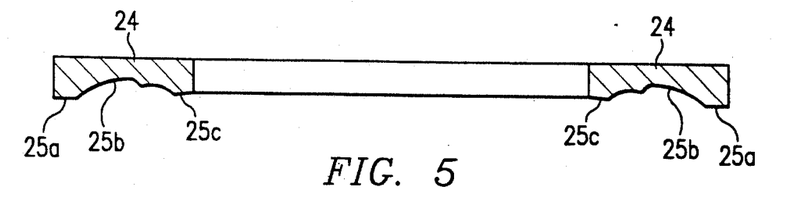
FIG. 5 is a sectional view of the initial member separated from the model.

Referring now to FIG. 5, the initial member 24 which has been cast as described above is shown separated from the model 2 (not shown in FIG. 5). The initial member 24 shown in FIG. 5 can be used as a pattern to prepare a sand cast (not shown) by standard sand casting techniques well known to those skilled in the art. Once a sand cast (not shown) has been prepared, with the initial member 24 shown in FIG. 5 as the pattern, a rigid member 18 can be formed by standard casting techniques well known to those skilled in the art, such that the rigid member 18 corresponds in shape and size to the initial member 24.

As will be discussed below, the rigid member 18 (as shown in FIGS. 10 and 11) may be made of steel and may be formed by standard sand casting techniques. When the molten steel used to form the rigid member 18 hardens or solidifies, there is some shrinkage or contraction of the steel. Generally, such shrinkage amounts to about 1% to 2%. In order to end up with the rigid member 18 being of the desired size (i.e., in accordance with predetermined specifications for the rigid member 18), the model 2 (and therefore the initial member 24) are designed to be about 1% to 2% larger than the desired size of the rigid member 18. When the steel used to form the rigid member 18 is then cast in the sand cast, the natural shrinkage or contraction of the steel results in the casting of the rigid member 18 which corresponds to the desired specifications.

For best results, I prefer to prepare a sand cast (not shown) by using the initial member 24 shown in FIG. 5 as the pattern and, once the sand cast has been prepared, casting rigid member 18 by casting liquid steel into the sand cast (not shown). Once the molten steel has cooled and hardened, a rigid member 18 made of steel which corresponds in shape and size to the initial member 24 can be removed from the sand cast (not shown) by standard methods. Of course, it will be understood that the rigid member 18 prepared by sand casting need not be made of steel; for example, other metals, such as aluminum or brass, also may be used.

Once the rigid member 18 has been prepared and removed from the sand cast, the surface of the rigid member 18 so formed often is rough. However, it is usually desirable for the rigid member 18 to have a finishing surface 19 as described above. Accordingly, for best results I prefer to finish the rigid member 18 formed by the sand casting in order to obtain a smooth finish on at least the finishing surface 19 of the rigid member 18. The finishing surface 19 is the facing surface of the rigid member 18 which corresponds to at least a portion of one side of the gasket portion 6 of the model 2. The finishing surface 19 defines at least a portion of the gasket forming cavity of the mold 1 to be formed. A smooth finish on the finishing surface 19 of the rigid member 18 is desirable because the smooth finishing surface 19 on the rigid member 18 will produce a smooth and finished surface on the corresponding portion of the gasket of the window gasket assembly to be formed in the gasket forming cavity of the mold 1. An aesthetically acceptable exterior finish on a portion of the gasket of the window gasket assembly to be formed is usually desirable for at least that portion of the window gasket assembly which faces the exterior of an automobile or other vehicle when the window gasket assembly has been installed or attached to the automobile or vehicle body. The finishing surface 19 may be prepared by standard techniques such as polishing the finishing surface 19 of the rigid member 18. Other techniques for preparing the finishing surface 19 can be used and are well known to those skilled in the art.

In an alternative embodiment of the invention, the finishing surface 19 can be prepared or formed by forming a hard chrome layer on the rigid member 18 in addition to polishing the rigid member 18. A finishing surface 19 consisting of the layer of hard chrome can be formed on the rigid member 18 by standard electroplating techniques. Such a hard chrome layer for the finishing surface 19 helps to minimize scratching and wear of the finishing surface 19. The use of a finishing surface 19 made of a hard chrome layer also can be polished to provide the corresponding gasket portion of the window gasket assembly formed by use of the finishing surface 19 with a bright or glossy type of finish or look. Using a chrome layer for the finishing surface 19 provides a way to obtain a finish which varies according to the smoothness of the chrome layer. By polishing the chrome layer which comprises the finishing surface 19, the finish of the window gasket assembly to be formed can be varied as desired.

The following discussion now addresses forming the mold 1, given an already prepared rigid member 18 having a finishing surface 19 corresponding to at least a portion of the gasket portion 6 of the model 2. Once the rigid member 18 has been prepared, the rigid member 18 and a first seal 30 are positioned adjacent the first side of the model 2 and the support 15 as shown in FIG. 6. As shown in FIG. 6, the rigid member 18 is positioned so that the finishing surface 19 is adjacent the gasket portion 6 of the model 2 and so that the rigid member 18 also abuts a portion of the support 15. The seal 30 is positioned adjacent the sheet portion 7 of the model 2 and adjacent the edge of the rigid member 18 which faces towards the open interior portion 50 (described below) of the mold 1.

Also shown in FIG. 6 are the first temperature control passageways 32; the temperature control passageways 32 are positioned adjacent the rigid member 18 above the gasket portion 6 of the model 2. The temperature control passageways 32 consist of hollow tubes which provide passageways in the first mold section 10 to be formed for circulating either a cooled or heated fluid (not shown) through the first mold section 10. Such passageway allow control of the temperature of the first mold section 10 (to be formed as discussed below) and of the gasket forming cavity to be defined by the first and second mold sections 10 and 12. Other techniques for controlling the temperature can also be provided. For example, heating elements such as electrical wires (not shown), could be disposed adjacent to the rigid member 18 instead of the temperature control passageways 32 shown in FIG. 6.

Figure 6A:
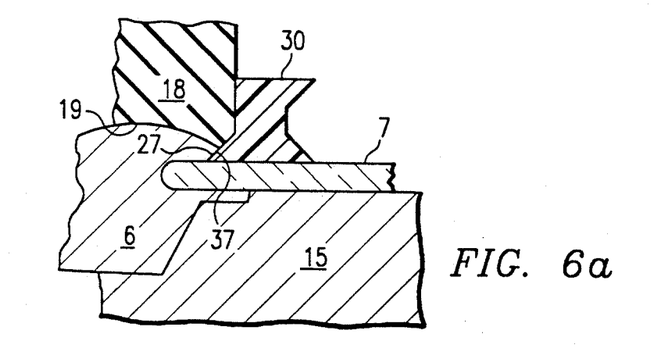
FIG. 6A is an enlarged sectional view of the model, the seal, the rigid member, and the support.

The seal 30 preferably is made of silicone, although other flexible materials, such as neoprene, can be used. The seal 30 can be formed in various ways, such as by extrusion and pressing the extruded material to obtain the shape desired for the seal 30. In FIG. 6A, the preferred embodiment of the seal 30 is shown having an angled facing portion 27 which extends outwardly from the open interior portion 50 (described below) of the first mold section 10 to be formed. The outwardly angled facing portion 27 of the sea 30 cooperates with the gasket portion 6 of the model 2 so that at least a portion of the outwardly angled facing portion 27 of the seal 30 undercuts the interior edge 37 of the gasket portion 6 of the model 2. Thus, at least part of the outwardly angled facing portion 27 is located or disposed between the rigid member 18 and the gasket portion 6 of the model 2. The outwardly angled facing portion 27 of the seal 30 cooperates with the finishing surface 19 of the rigid member 18 so as to define a surface corresponding to the shape and size of the gasket portion 6 of the model 2. Hence, when the model 2 is removed, the first mold section 10 to be formed, together with the finishing surface 19 and the seal 30, will cooperate to define a portion of the gasket forming cavity of the mold 1. The shape of the gasket forming cavity so defined by the outwardly angled facing portion 27 of the seal 30 and the finishing surface 19 provides the advantage of more effectively preventing any leakage of a gasket forming material (not shown) from the gasket forming cavity (and the resulting formation of flash on a sheet around the peripheral edge of which a gasket is to be molded), while at the same time preventing the formation of a gasket within the gasket forming cavity which will have a portion exposed to view which is not aesthetically acceptable. This latter advantage is provided by having the outwardly angled facing portion 27 of the seal 30 undercut the finishing surface 19 of the rigid member 18.

FIG. 6A shows the preferred shape of the seal 30. As is shown in FIG. 6A, the outwardly angled facing portion 27 undercuts the gasket portion 6 of the model 2 and also the finishing surface 19 of the rigid member 18. The outwardly angled facing portion 27 preferably extends towards the sheet portion 7 of the model 2 at an angle of approximately 45°. It will be understood, however, that the outwardly angled facing portion 27 of the seal 30 need not be linear in shape (as is shown in FIG.

6A), nor does it need to extend towards the sheet portion at an angle of 45°. For a detailed description of the use of the outwardly angled facing portion 27 of the seal 30, see my copending U.S. patent application Ser. No. 519,395, filed on May 4, 1990.

Figure 7:
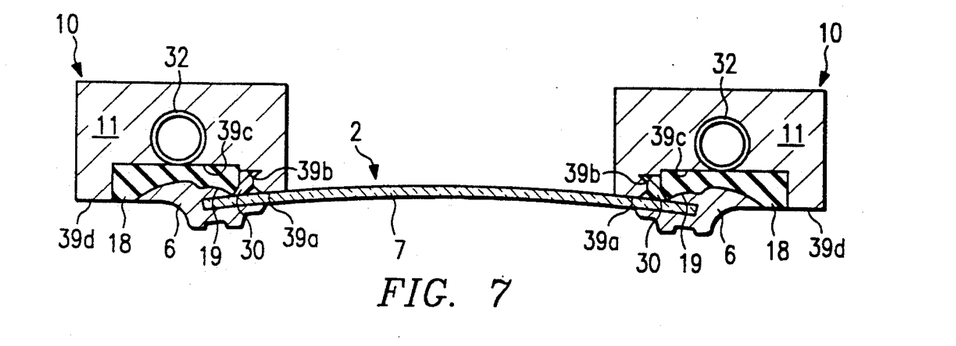
FIG. 7 is a sectional view of the first mold section, including the model, the rigid member, the seals, and the temperature control means.

Referring back to FIG. 6, a second pair of corresponding retaining walls 34a and 34b are positioned to define a second channel 36 therebetween; the second channel 36 extends around the peripheral edge of the model 2. As shown in FIG. 6, the inner retaining wall 34a is positioned on top of the sheet portion 7 of the model 2, while the outer retaining wall 34b is positioned beyond the peripheral edge of the gasket portion 6 of the model 2 and the rigid member 18. In FIG. 6, the outer retaining wall 34b is shown extending down along the outer side of the support 15. The channel 36 defined between the second pair of retaining walls 34a and 34b is defined between an inner face 39 of the retaining wall 34a, while the outer face 40 of the channel 36 is defined by the outer retaining wall 34b. The bottom of the channel 36 is adjacent to and defined by a portion of the support 15, the rigid member 18, the passageways 32, the seal 30, and a portion of the sheet portion 7 of the model 2. As can be seen, the passageways 32 are located above the rigid member 18. Once the first mold section 10 (as shown in FIG. 7) has been formed, such as in the manner described below, the passageways 32 are located within the body of the first mold section 10 and do not contact the second mold section 12.

Once the retaining walls 34a and 34b have been properly positioned as is shown in FIG. 6, the first mold section 10 can be formed within the channel 36 by introducing a liquid material into the channel 36. For best results, the bottom of the channel 36 and the inner sides of the retaining walls 34a and 34b which define the channel 36 therebetween are coated with a release agent before any mold-forming material is introduced into the channel. As noted above, the release agent is preferably QZ 11, a type which is commercially available from CIBA GEIGY. In the preferred embodiment of the invention, a liquid (described below) is introduced by casting or pouring it into the channel 36 from above. It will be understood, however, that the material used to form the first mold section 10 could be introduced into the channel 36 in other ways, such as by pumping or injecting. When the material cures or hardens, the first mold section 10 will be formed about the seal 30, the rigid member 18, the temperature control passageways 32, and adjacent a portion of the support 15, as well as adjacent a portion of the sheet portion 7 of the model 2, as shown in FIG. 6. As shown in FIG. 7, the first mold section 10 so formed thus has a base 11 which has surfaces 39a, 39b, 39c, and 39d facing the first side of the sheet portion 7 of the model 2, the seal 30, the rigid member 18, and a portion of the support 15, respectively. Generally, the first mold section 10 thus includes the base 11, the rigid member 18, and the passageways 32. The seal 30 can be secured within a groove in the first mold section 10 or can be releasably held within the groove in the first mold section 10 which corresponds to the seal 30 (about which the base 11 of the first mold section 10 was formed).

In the preferred embodiment of the invention, the material used to form the first- mold section 10 is a resin made from 100 parts by weight ARALDIT CW217 and 10 parts by weight Hardener HY956, both of which are commercially available from CIBA GEIGY. In the preferred embodiment of the invention, the material used to form the first mold section 10 further includes a charge of particles of a metallic dust, specifically aluminum dust. It will be understood, however, that other types of metallic particles may be used, such as bronze or steel dust, or a mixture thereof. The use of a charge of a metallic dust included in the resin material used to form the first mold section 10 further enhances the ability of the first mold section 10 to conduct heat energy and also enhances the smoothness of the surface finish on the face of the window gasket assembly to be formed by the mold 1 to be formed. Forming the first mold section 10 (and also the second mold section 12) of a resin or polymeric material provides several advantages. Such polymeric materials are less expensive than other materials, such as metals like steel or aluminum. Moreover, the polymeric materials can be used to rapidly form the first mold section 10; the steps of pouring or casting the resin material and allowing it to cure typically requires only about 240 minutes. Additionally, the time and cost of machining metallic mold sections is eliminated.

Once the material used to form the first mold section 10 has been cast in the channel 36 and allowed to at least partially cure or harden, the retaining walls 34a and 34b and the support 15 can be removed from the model 2 and the first mold section 10. FIG. 7 is a sectional view showing the first mold section 10 as formed about the rigid member 18, the seal 30, and the temperature control passageways 32, all as positioned adjacent to and abutting the model 2. As shown in FIG. 7, the retaining walls 34a and 34b and the support 15 have been removed from the first mold section 12 and the model 2.

Figure 8:
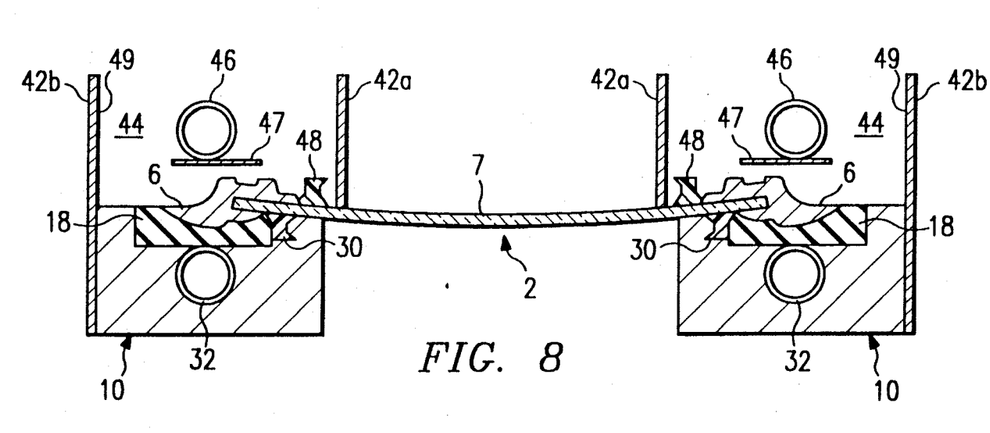
FIG. 8 is a sectional view of the model, the first mold section, a pair of retaining walls defining a channel therebetween, and the temperature control means.

Referring now to FIG. 8, the first mold section 10 and the model 2 are shown as positioned prior to forming the second mold section 12. As shown in FIG. 8, the model 2 and the first mold section 10 are positioned so that the second side of the model 2 is exposed, while the first side of the model 2 rests on top of the first mold section 10. Essentially, the first mold section 10 and the model 2 (together with the seal 30, the rigid member 18, and the temperature control passageways 32) have been inverted from the position in which the first mold section 10 was formed (as described above and as show in FIG. 7).

As shown in FIG. 8, a third pair of corresponding retaining walls 42a and 42b has been positioned on top of the second side of the model 2 and on top of the first mold section 10 to define a third channel 44 therebetween. The inner retaining wall 42a is positioned on top of the second side of the sheet portion 7 of the model 2, while the outer retaining wall 42b is positioned approximately one inch to two inches outside of the peripheral edge of the gasket portion 6 of the model 2 (FIG. 8 is not drawn to scale). In FIG. 8, the outer retaining wall 42b has been located so that the exterior face 49 of the third channel 44 defined by the retaining walls 42a and 42b is adjacent the outer side of the first mold section 10. The bottom of the channel 44 is defined by portions of the first mold section 10, the gasket portion 6 of the model 2, a second seal 48 (discussed below), and the sheet portion 7 of the model 2.

A second set of temperature control passageways 46 is shown positioned above, but not adjacent to, the gasket portion 6 of the model 2 in FIG. 8. In the preferred embodiment of the invention, the second temperature control passageways 46 are located near, but not adjacent, the gasket portion 6 of the model 2. If the second temperature control passageways 46 are located adjacent to the gasket portion 6 of the model 2, the corresponding shape of the second mold section 12 (to be formed) adjacent the gasket forming cavity of the mold 1 will be distorted. Thus, the resulting distorted shape of the second mold section 12 would be undesirable. The second temperature control passageways 46 can be positioned near, but apart from, the gasket portion 6 of the model 2 such as by suspending the passageways 46 in the channel 44 from wires or strings attached thereto (not shown). Thus, the passageways 46 can be properly positioned within the third channel 44 without abutting the gasket portion 6 of the model 2.

Since the material used to form the second mold section 12 may not be a good thermal conductor, I prefer to use a plate 47 to help control the temperature in the gasket forming cavity of the mold 1 to be formed. As shown in FIG. 8, the plate 47 has been attached to the temperature control passageways 46 and is located between the temperature control passageways 46 and the gasket portion 6 of the model 2. I prefer to use a plate 47 made of bronze, although other materials such as steel, copper, or aluminum could be used. The plate 47 preferably is welded to the temperature control passageways 46, although the plate 47 can be attached by other methods. By using the plate 47, control of the temperature of the gasket forming cavity of the mold 1 to be formed can be more easily maintained.

Once the retaining walls 42a and 42b have been properly positioned and the second temperature control passageways 46 are also properly positioned, a mold-forming material can be poured into or cast in the third channel 44 to form the second mold section 12 about the second temperature control passageways 46 and the second side of a peripheral portion of the model 2, so that the second mold section 12 has a surface facing and adjacent the second side of a peripheral portion of the model 2, a portion of the rigid member 18, and a portion of the first mold section 10. The second mold section 12 also may be formed so that it has a surface facing the second seal 48 as described below. As discussed above in connection with forming the first mold section 10, I prefer to use the release agent QZ 11 from CIBA GEIGY to coat the sides and bottom of the third channel 44 prior to pouring or casting the material used to form the second mold section 12 into channel 44. In the preferred embodiment of the invention, the material used to form the second mold section 12 is a resin made from 100 parts by weight UREOL 6414A and 64 parts by Weight UREOL 6414B, both of which are commercially available from CIBA GEIGY. Once the material to be used for forming the second mold section 12 has been poured into the channel 44 and has been allowed to at least partially harden or cure, the retaining walls 42a and 42b can be removed.

In the preferred embodiment of the invention, a second seal 48 (of the same shape and material as the seal 30 as described above) can be positioned within the channel 44 prior to forming the second mold section 12. As shown in FIG. 8, the second seal 48 has been positioned on top of and adjacent the second side of the sheet portion 7 of the model 2 so that a outwardly angled facing portion 27 of the second seal 48 is adjacent to the interior edge of the gasket portion 6 of the model 2.

Figure 9:
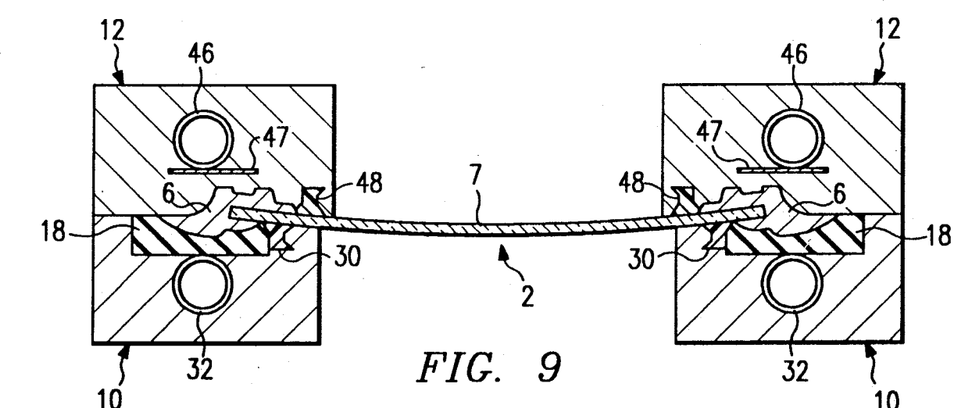
FIG. 9 is a sectional view of the model, the first mold section, and the second mold section, which includes temperature control passageways.

FIG. 9 shows the first mold section 10, which is formed about the first temperature control passageways 32, the rigid member 18, and the seal 30, and also shows the second mold section 12, which has been formed about the second seal 48 and the second temperature control passageways 46. As shown in FIG. 9, a peripheral portion of the model 2 of the window gasket assembly is located between the first mold section 10 and the second mold section 12 so formed. The first and second mold sections 10 and 12 are shown in a closed position in FIG. 9. The second mold section 12 so formed has a surface facing a portion of the first mold section 10, a portion of the rigid member 18, the second side of the gasket portion 6 of the model 2, the second seal 48, and a portion of the sheet portion 7 of the model 2. As discussed above in connection with the seal 30, the second seal 48 can be secured within a groove in the body of the second mold section 12 or releasably held within a groove in the second mold section 12 formed about the seal 48 when the second mold section 12 was formed.

Since it is generally desirable for the first mold section 10 and the second mold section 12 to not touch the glass sheet when used in connection with forming window gasket assemblies, portions of the first mold section 10 and the second mold section 12 can be removed so as to define spaces 51 between the interior portions of each of the first mold section 10 and the second mold section 12 and the sheet portion 7 of the model 2. As shown in FIG. 10, portions of the first mold section 10 and the second mold section 12 have been removed so as to avoid any contact between the first mold section 10 and the second mold section 12 and the sheet portion 7 of the model 2. Alternatively and preferably, inserts (not shown) can be positioned adjacent the sheet portion 7 of the model 2 when the first mold section 10 and the second mold section 12 are formed. Such inserts (not shown) are preferably made of a flexible plastic and are placed so as to extend between the seals 30 and 48 and the interior retaining walls 34a and 42a when the first mold section 10 and the second mold section 12, respectively, are formed as described above. Once the first and second mold sections 10 and 12 have been formed, the inserts (not shown) can be removed, leaving spaces 51 as shown in FIG. 10. As is also shown in FIG. 10, the first and second mold sections 10 and 12 have been attached to a conventional apparatus for opening and closing the mold 1.

Once the second mold section 12 has been formed, the first and second mold sections 10 and 12 are separated, the model 2 is removed from between the first and second mold sections 10 and 12, and then the first and second mold sections 10 and 12 are attached to a conventional apparatus for opening and closing the mold 1 formed by the first and second mold sections 10 and 12. Referring now to FIG. 11, the first mold section 10 and the second mold section 12 are shown in a separated and spaced apart relationship (i.e., the mold 1 is in an open position). The model 2 of the window gasket assembly has been removed from both the first mold section 10 and second mold section 12 in FIG. 11 and is shown ready for removal from the mold 1 formed by the first mold section 10 and the second mold section 12. As is also shown in FIG. 11, the first mold section 10 and the second mold section 12 are attached to a conventional apparatus for opening and closing the mold 1 comprised of the first mold section 10 and the second mold section 12.

Also shown in FIG. 11 are stopping pins 8a and 8b. In the mold 1, the stopping pins 8a and 8b (shown in an open position in FIG. 11) are located outwardly of the first mold section 10 and the second mold section 12. In the preferred embodiment of the mold 1, the stopping pins 8a and 8b are made of a metal such as steel and are thus substantially rigid. The stopping pins 8a and 8b thereby serve to limit and define the closure of the first mold section 10 and the second mold section 12 and to limit or minimize the compression of the seals 30 and 48 and the deformation of the gasket forming cavity of the mold 1.

The upper stopping pins 8b have extending tip portions 9. Each lower stopping pin 8a is substantially cylindrical in shape and has an open end and hollow body portion for receiving the corresponding extending tip portion 9 of the corresponding upper stopping pin 8b. The tip portions 9 serve to guide and position the upper stopping pins 8b and the corresponding second mold section 12 as they are lowered, respectively, onto lower stopping pins 8a and the first mold section 10 when the mold 1 is closed. As shown in FIG. 11, the tip portions 9 in a preferred embodiment of the mold 1 are substantially conically shaped and adapted for engagement with the open ends of the lower stopping pins 8a. The closure of the first mold section 10 and the second mold section 12 also can be limited and defined by the contact of portions of the abutting portions 10a and 12a of the facing surfaces of the first mold section 10 and the second mold section 12, respectively, located outwardly of the open interior portion 50 of the mold 1.

As shown in the foregoing drawings, the first mold section 10 and the second mold section 12, as well as the mold formed thereby, has an open interior portion 50 such that the first mold section 10 and the second mold section 12 are roughly ring-shaped, each forming a ring roughly in the shape of the sheet portion 7 of the model 2 of the window gasket assembly. The open interior portion 50 of the ring-shaped first mold section 10 and second mold section 12 cooperates with the removed portions of the first mold section 10 and the second mold section 12 to define a sheet receiving chamber for the mold 1. However, it will be understood that the first mold section 10 and the second mold section 12 need not be ring-shaped, but instead may extend continuously across the interior portion of the mold 1. The open interior portion 50 of the first mold section 10 and the second mold section 12 is preferred in order to avoid scratching the surface of or otherwise damaging the glass sheets around which a gasket is to be formed during the molding operations of the mold 1 prepared in accordance with the present invention. An open interior portion 50 also provides the advantage of using less material for the first mold section 10 and the second mold section 12, resulting in a less expensive mold 1.

The foregoing discussion discloses and describes the preferred embodiment of the present invention. Those skilled in the art will recognize from the foregoing discussion that various changes, modifications, and variations may be made thereto without departing from the spirit and scope of the invention as defined in the claims.

I claim:

1. A method of making a mold comprising the steps of:
   positioning a seal and a rigid member having a finishing surface which corresponds to at least a portion of a first side of an object, wherein said object has a first side and a second side, adjacent to the first side of said object; and
   forming a first mold section about said rigid member, said seal, and adjacent the first side of said object, wherein said first mold section has a surface facing the first side of said object.

2. The method according to claim 1 further comprising the steps of:
   forming a second mold section about the second side of said object, wherein said second mold section has a surface facing the second side of said object, at least a portion of said rigid member, and at least a portion of said first mold section; and
   separating said first mold section and said second mold section and removing said object from said first mold section and said second mold section.

3. The method according to claim 1 wherein said object is a model of an object to be formed and further comprising the step of:
   preparing a model of an object to be formed, wherein said model has a first side and a second side.

4. The method according to claim 1 wherein said object is a model of a window gasket assembly and further comprising the step of:
   preparing a model of a window gasket assembly, wherein said model has a first side and a second side.

5. The method according to claim 1 further comprising the step of:
   removing portions of said first mold section and said second mold section adjacent said object.

6. The method according to claim 1 further comprising the step of:
   positioning a second seal adjacent the second side of said object prior to forming said second mold section, wherein said second mold section is formed about the second side of said object and said second seal, and wherein said second mold section has a surface facing at least a portion of the second side of said object and at least a portion of said first mold section.

7. The method according to claim 1 wherein said seal has an outwardly angled facing portion and said seal and said rigid member are positioned so that the outwardly angled facing portion of said seal is disposed between at least a portion of the finishing surface of said rigid member and said first side of said object.

8. The method according to claim 1 further comprising the step of preparing a rigid member having a finishing surface.

9. The method according to claim 8 wherein the step of preparing a rigid member comprises the steps of:
   positioning said object on a support so that the first side of said object is exposed;
   positioning at least two corresponding retaining walls defining a channel therebetween adjacent the first side of said object, wherein the channel extends around at least a peripheral portion of the first side of said object;
   forming an initial member in the channel;
   removing said retaining walls;
   removing said initial member from said object;
   preparing a sand cast corresponding to the shape of said initial member;
   forming said rigid member in said sand cast; and
   preparing a finishing surface of said rigid member.

10. The method according to claim 9 wherein the step of forming said initial member comprises the steps of:
    introducing a polymeric material into the channel; and
    allowing said material to at least partially cure, wherein said material cures to form said initial member.

11. The method according to claim 1 further comprising the step of:
   positioning temperature control means adjacent said rigid member prior to forming said first mold section, and wherein said first mold section is formed about said rigid member, said seal, said temperature control means, and adjacent said object.

12. The method according to claim 11 further comprising the step of:
   positioning second temperature control means near the second side of said object prior to forming said second mold section, wherein said second mold section is formed about the second side of said object and said second temperature control means.

13. A method of making a mold comprising the steps of:
   positioning a seal and a rigid member having a finishing surface which corresponds to at least a portion of a first side of a model of a window gasket assembly, wherein said model has a first side and a second side, adjacent to the first side of said model;
   forming a first mold section about said rigid member, said seal, and adjacent the first side of said model, wherein said first mold section has a surface facing the first side of said model;
   forming a second mold section about the second side of said model, wherein said second mold section has a surface facing the second side of said model, at least a portion of said rigid member, and at least a portion of said first mold section; and
   separating said first mold section and said second mold section and removing said model from said first mold section and said second mold section.

14. The method according to claim 13 further comprising the step of:
   preparing a model of a window gasket assembly, wherein said model has a first side and a second side.

15. The method according to claim 13 further comprising the step of:
   positioning temperature control means adjacent said rigid member prior to forming said first mold section, wherein said first mold section is formed about said rigid member, said seal, and said temperature control means, and adjacent at least a portion of the first side of said window gasket assembly.

16. The method according to claim 13 further comprising the step of:
   positioning a second seal adjacent the second side of said model prior to forming said second mold section, wherein said second mold section is formed about the second side of said model and said second seal, and wherein said second mold section has a surface facing at least a portion of the second side of said model and at least a portion of said first mold section.

17. A method of making a mold for a window gasket assembly comprising the steps of:
   preparing a model of a window gasket assembly, wherein said model has a first side and a second side;
   positioning said model so that the first side of said model is exposed;
   positioning at least two corresponding first retaining walls defining a first channel therebetween, wherein the first channel is adjacent the first side of said model and wherein the first channel extends around at least a peripheral portion of said model;
   forming an initial member in the first channel;
   removing said first retaining walls;
   separating said initial member from said model;
   preparing a sand cast corresponding to at least a portion of the shape of said initial member;
   forming a rigid member in said sand cast;
   preparing a finishing surface of said rigid member;
   positioning said rigid member and a seal adjacent the first side of said model;
   positioning at least two corresponding second retaining walls defining a second channel therebetween, wherein the second channel is adjacent the first side of said model and wherein the second channel extends around at least a peripheral portion of said model;
   forming a first mold section in the second channel, wherein said first mold section is formed about said rigid member and said seal, and wherein said first mold section has a surface facing the first side of said model;
   removing said second retaining walls;
   positioning said model so that the second side of said model is exposed;
   positioning at least two corresponding third retaining walls defining a third channel therebetween, wherein the third channel is adjacent the second side of said model and wherein the third channel extends around at least a peripheral portion of said model;
   forming a second mold section in the third channel, wherein said second mold section has a surface facing the second side of said model, at least a portion of said rigid member, and at least a portion of said first mold section;
   removing said third retaining walls; and
   removing said model from said first mold section and said second mold section.

18. The method according to claim 17 further comprising the step of:
   positioning temperature control means adjacent said rigid member prior to forming said first mold section, and wherein said first mold section is formed about said rigid member, said seal, and said temperature control means, and adjacent said model.

19. The method according to claim 17 further comprising the step of:
   positioning a second seal adjacent the second side of said model prior to forming said second mold section, wherein said second mold section is formed about the second side of said model and said second seal, and wherein said second mold section has a surface facing at least a portion of the second side of said model and at least a portion of said first mold section.

20. The method according to claim 17 comprising the further step of:
   removing portions of said first mold section and said second mold section adjacent said model.

* * * * *